US008797272B2

(12) United States Patent
Hsu et al.

(10) Patent No.: US 8,797,272 B2
(45) Date of Patent: Aug. 5, 2014

(54) ELECTRONIC DEVICES WITH PRESELECTED OPERATIONAL CHARACTERISTICS, AND ASSOCIATED METHODS

(76) Inventors: Chih-Feng Hsu, Taoyuan (TW); Yih-Feng Kao, Taoyuan (TW); John C. Wang, Taoyuan (TW)

( * ) Notice: Subject to any disclaimer, the term of this patent is extended or adjusted under 35 U.S.C. 154(b) by 1297 days.

(21) Appl. No.: 12/082,646

(22) Filed: Apr. 10, 2008

(65) Prior Publication Data

US 2008/0284743 A1   Nov. 20, 2008

(30) Foreign Application Priority Data

May 15, 2007 (TW) ................. 96117293 A
May 15, 2007 (TW) ................. 96117298 A
May 15, 2007 (TW) ................. 96117302 A
May 15, 2007 (TW) ................. 96117306 A

(51) Int. Cl.
*G06F 3/041* (2006.01)

(52) U.S. Cl.
USPC ........................................ 345/173; 178/18.01

(58) Field of Classification Search
USPC .................. 345/173–179; 178/18.01–19.04
See application file for complete search history.

(56) References Cited

U.S. PATENT DOCUMENTS

| 4,827,085 | A | * | 5/1989 | Yaniv et al. ................... 345/174 |
| 5,610,629 | A | | 3/1997 | Baur |
| 5,945,980 | A | | 8/1999 | Moissev et al. |
| 5,956,020 | A | | 9/1999 | D'Amico et al. |
| 6,310,610 | B1 | * | 10/2001 | Beaton et al. ................. 345/173 |
| 6,611,258 | B1 | | 8/2003 | Tanaka et al. |
| 6,958,749 | B1 | * | 10/2005 | Matsushita et al. ........... 345/175 |
| 7,643,011 | B2 | * | 1/2010 | O'Connor et al. ............ 345/173 |
| 2001/0013855 | A1 | | 8/2001 | Fricker et al. |
| 2002/0080123 | A1 | * | 6/2002 | Kennedy et al. .............. 345/173 |
| 2006/0146038 | A1 | * | 7/2006 | Park et al. .................... 345/173 |
| 2006/0197750 | A1 | | 9/2006 | Kerr et al. |

FOREIGN PATENT DOCUMENTS

| EP | 0927949 | 7/1999 |
| EP | 1628196 | 2/2006 |
| JP | 09231006 | 9/1997 |
| JP | 2000172441 A | 6/2000 |
| JP | 2003271310 A | 9/2003 |
| JP | 2004213312 A | 7/2004 |
| JP | 04199416 B2 | 12/2008 |

OTHER PUBLICATIONS

European Search Report for European Application No. 08008442; Applicant: High Tech Computer Corp.; Date of Mailing: Jul. 31, 2008 (6 pages).
European Extended Search Report for European Application No. 08008862.8, Applicant: High Tech Computer Corp., mailed Dec. 1, 2008, 6 pages.

* cited by examiner

*Primary Examiner* — Jimmy H Nguyen
(74) *Attorney, Agent, or Firm* — Perkins Coie LLP

(57) ABSTRACT

Electronic devices with preselected operational characteristics and associated methods are disclosed. The electronic devices can include a touch sensing component that senses a touch from an input mechanism and an input circuitry that measures at least one parameter of the touch from the touch sensing component. The electronic devices can also include a processor that performs an analysis of the measured at least one parameter of the detected touch and implements preselected operational characteristics of the electronic device based on the performed analysis.

33 Claims, 8 Drawing Sheets

ELECTRONIC DEVICES WITH PRESELECTED OPERATIONAL CHARACTERISTICS, AND ASSOCIATED METHODS

CROSS-REFERENCE TO RELATED APPLICATION(S)

This application claims priority to Taiwanese Patent Application No. 096117293, filed May 15, 2007; Taiwanese Patent Application No. 096117298, filed May 15, 2007; Taiwanese Patent Application No. 096117302, filed May 15, 2007; and Taiwanese Patent Application No. 096117306, filed May 15, 2007, the disclosures of which are incorporated herein by reference in their entirety.

TECHNICAL FIELD

The present disclosure relates to electronic devices having preselected user interface, functionality, and/or other operational characteristics.

BACKGROUND

Current mobile communication/computing devices typically include a display for outputting information and a keyboard/keypad for receiving responses from users. On most devices, hotkeys provide users with direct access to frequently-used functions (e.g., answering a phone call, accessing e-mail, etc.) However, space constraints on devices typically limit the number of hotkeys that can be placed on each device. As a result, users must navigate through icons scattered over a large number of software menus to access certain functions. This navigation can be laborious and thus reduce user satisfaction with operating the devices. Accordingly, there is a need to improve the overall usability of the mobile communication/computing devices.

DETAILED DESCRIPTION

A. Overview

The present disclosure describes electronic devices with preselected operational characteristics and associated methods. It will be appreciated that several of the details set forth below are provided to describe the following embodiments in a manner sufficient to enable a person skilled in the relevant art to make and use the disclosed embodiments. Several of the details and features described below, however, may not be necessary to practice certain embodiments of the invention. Additionally, the invention can include other embodiments that are within the scope of the claims but are not described in detail with respect to FIGS. 1-8.

B. Electronic Devices with Preselected Operational Characteristics

Figure 1:
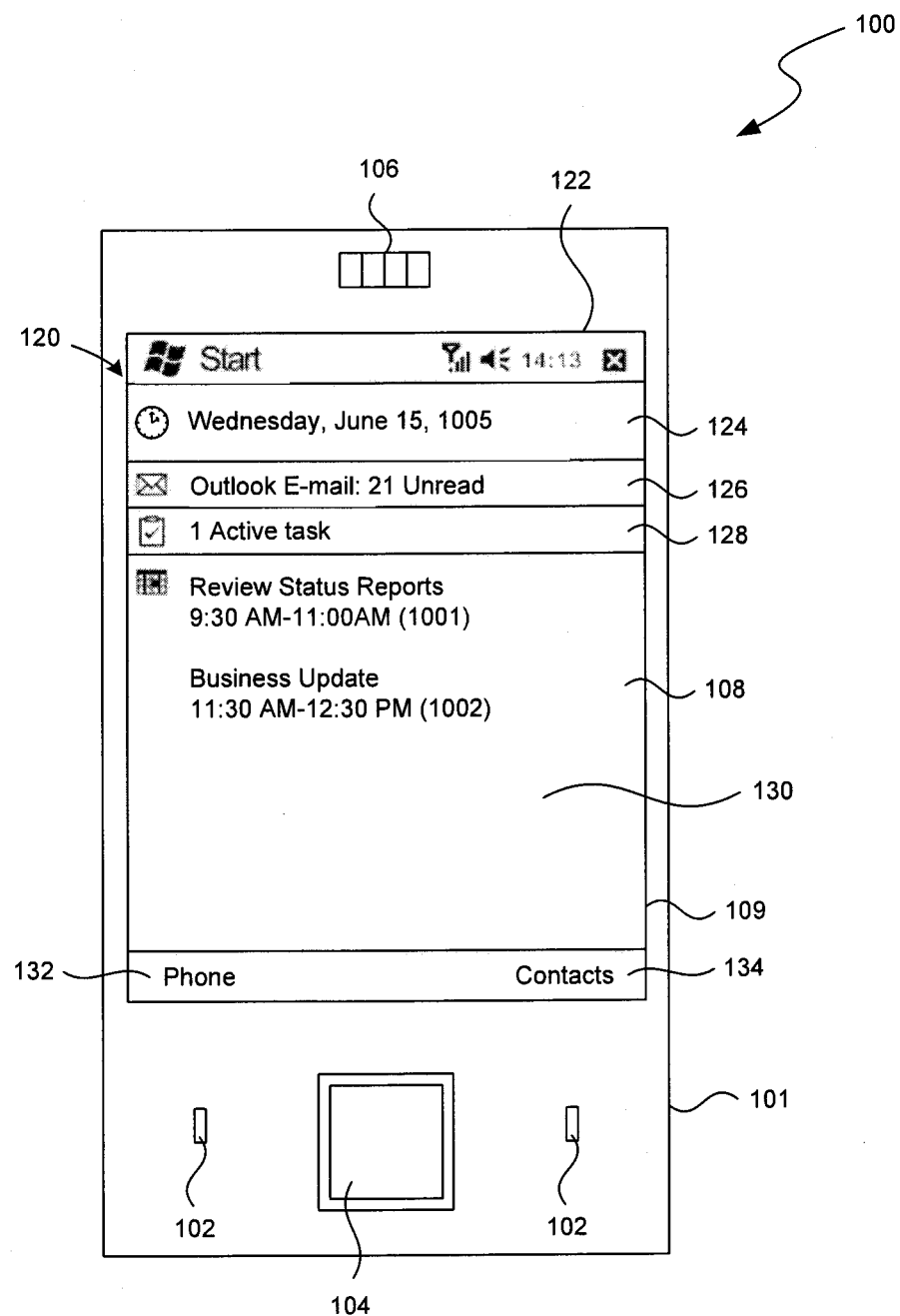
FIG. 1 is a front view of an electronic device having preselected operational characteristics and configured in accordance with an embodiment of the invention.
Figure 2:
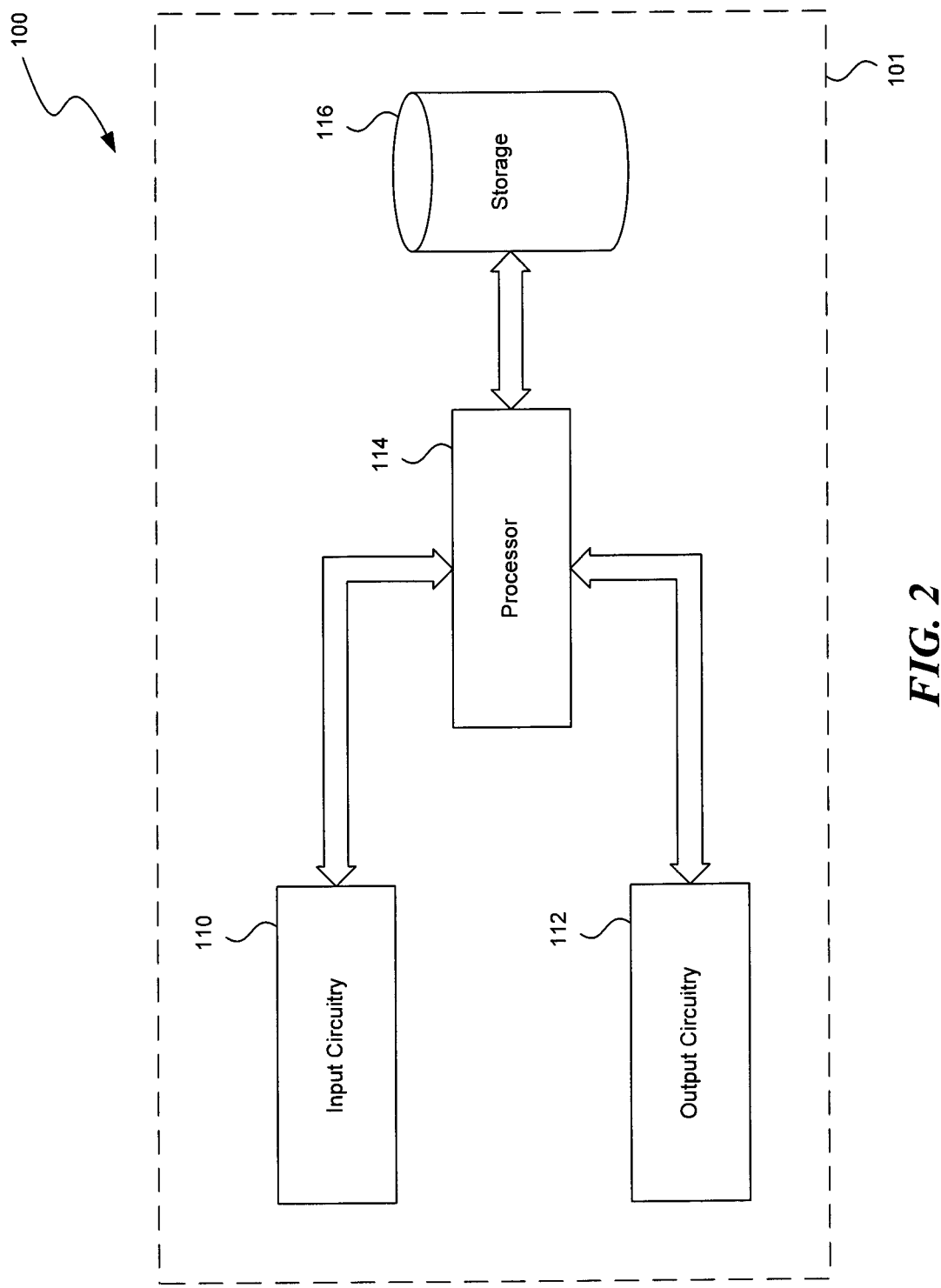
FIG. 2 is a functional schematic view of internal components of the electronic device in FIG. 1.
Figure 3:
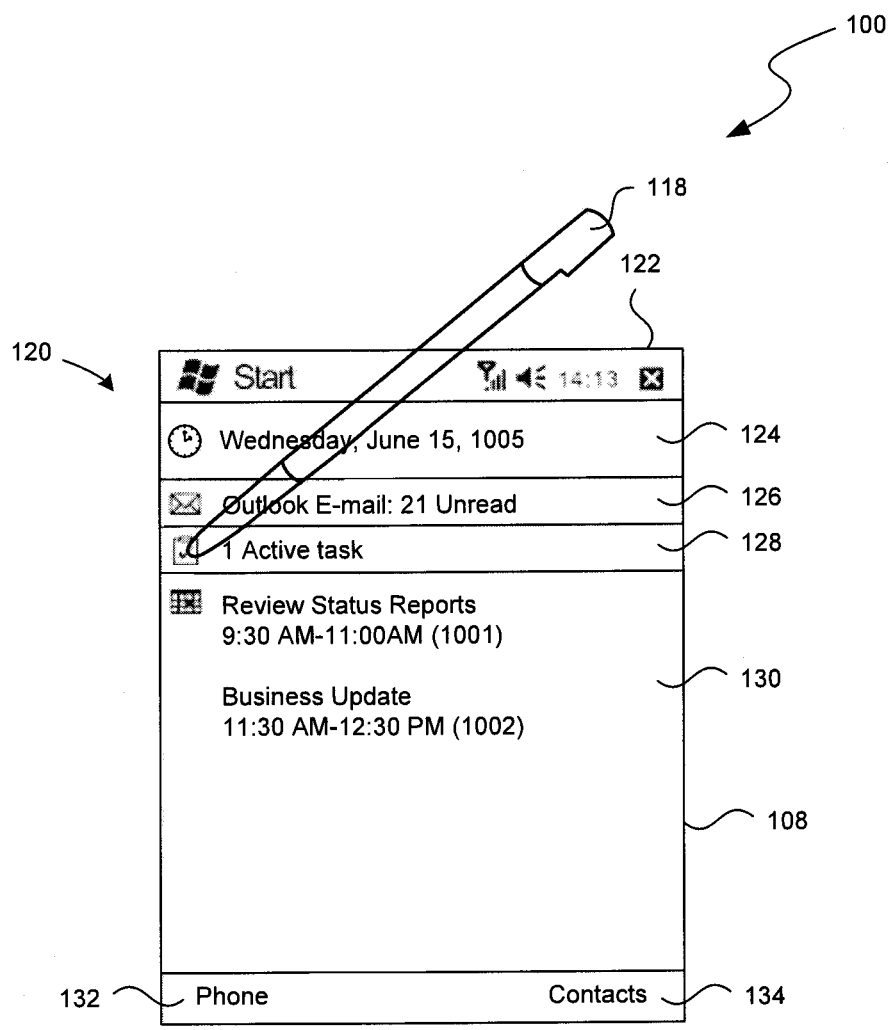
FIG. 3 is a front view of a portion of the electronic device of FIG. 1 when accessed using a pointing device and configured in accordance with another embodiment of the invention.
Figure 4:
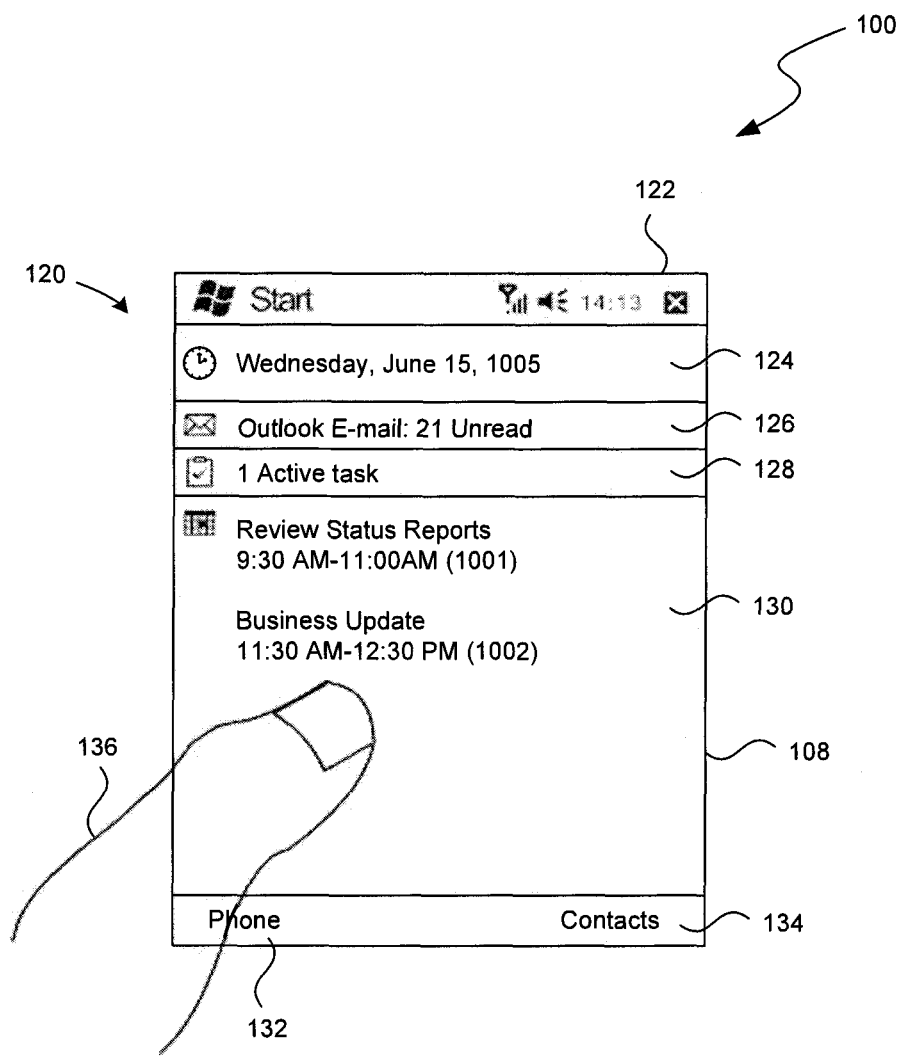
FIG. 4 is a front view of a portion of the electronic device of FIG. 1 when accessed using a finger and configured in accordance with another embodiment of the invention.
Figure 5:
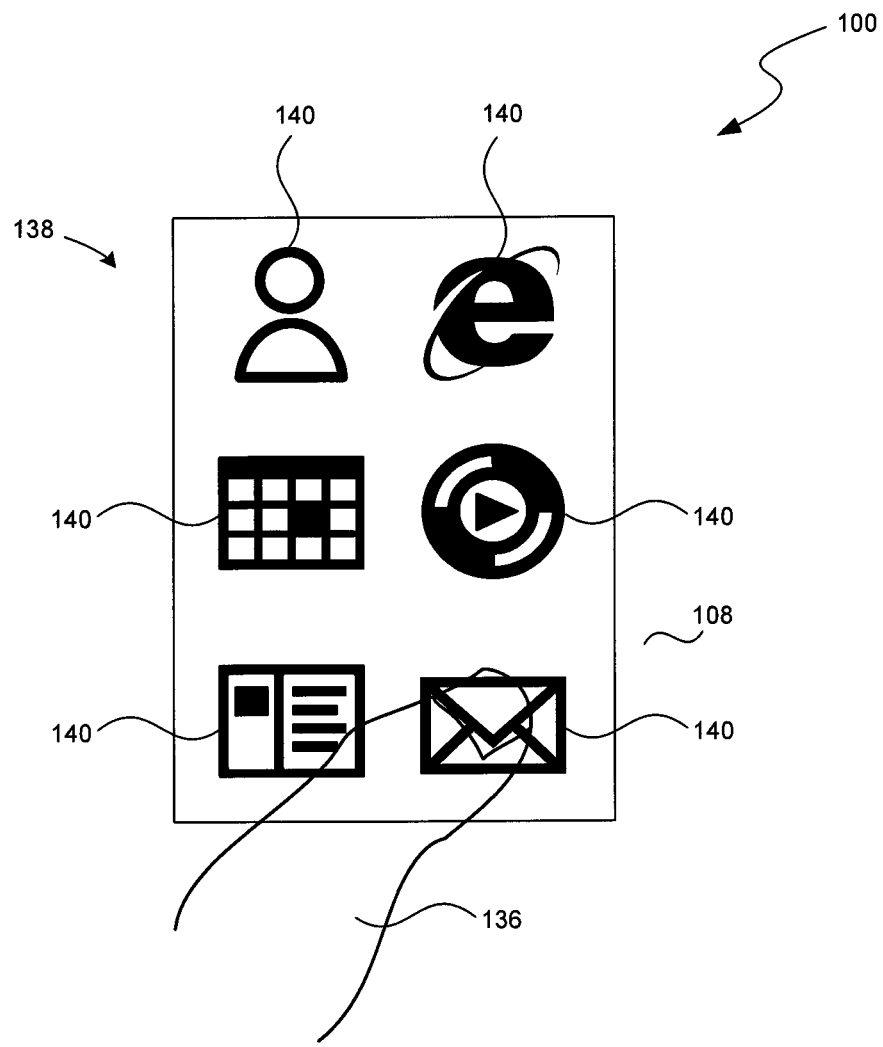
FIG. 5 is another front view of a portion of the electronic device of FIG. 1 when accessed using a finger and configured in accordance with another embodiment of the invention.

One embodiment of an electronic device 100 with preselected operational characteristics is described below with reference to FIGS. 1-5. FIG. 1 is a front view of the electronic device 100, and FIG. 2 is a functional schematic view of internal components of the electronic device 100 of FIG. 1. FIGS. 3-5 are front views of a portion of the electronic device 100 of FIG. 1 when accessed using different input mechanisms in accordance with one embodiment.

As shown in FIG. 1, the electronic device 100 can include a housing 101, a plurality of push buttons 102, a directional keypad 104 (e.g., a five-way key), a speaker 106, and a display 108 carried by the housing 101. The electronic device 100 can also include microphones, transceivers, photo sensors, and/or other computing components generally found in PDA devices, cellular phones, laptop computers, tablet PCs, smart phones, hand-held email devices, or other mobile communication/computing devices.

The display 108 can include a liquid-crystal display (LCD), a plasma display, a vacuum fluorescent display, a light-emitting diode (LED) display, a field emission display, and/or other suitable types of display configured to present a user interface 120. The user interface 120 can include text representing programs, operational options, and files and graphical images of windows, fields, dialog boxes, menu items, icons, buttons, cursors, and scroll bars. For example, the user interface 120 can include a status bar 122, a time/date menu 124, an outlook menu 126, a task menu 128, and a calendar menu 130. The user interface 120 can also include a phone key 132, a contact key 134, and/or other soft keys.

The electronic device 100 can also include a touch sensing component 109 configured to receive input from a user. For example, the touch sensing component 109 can include a resistive, capacitive, infrared, surface acoustic wave (SAW), and/or other types of touch screen. The touch sensing component 109 can be integrated with the display 108 or can be independent from the display 108. In the illustrated embodiment, the touch sensing component 109 and the display 108 have generally similarly sized access areas. In other embodiments, the touch sensing component 109 and the display 108 can have differently sized access areas. For example, the touch sensing component 109 can have an access area that extends beyond a boundary of the display 108.

In certain embodiments, in addition to or in lieu of the touch sensing component 109, the electronic device 100 can also include a pressure sensor, a temperature sensor, an optical image sensor, and/or other types of sensors (not shown) independent from or integrated with the display 108. For example, the electronic device 100 can include a thermocouple, a resistive temperature detector, and/or other types of temperature sensors proximate to the display 108 for measuring a temperature of an input mechanism, the display 108, and/or the touch sensing component 109.

FIG. 2 is a functional schematic view of internal components of the electronic device 100 in FIG. 1. As shown in FIG. 2, the electronic device 100 can include an input circuitry 110, an output circuitry 112, a processor 114, and a storage 116 operatively connected to one another, as shown in FIG. 2. The input circuitry 110 can include analog and digital signal controllers for sampling input signals from, e.g., the push buttons 102, the directional keypad 104, and/or the touch sensing component 109. For example, the input circuitry 110 can include a 5-wire touch screen controller (Model No. ADS7845), supplied by Texas Instrument of Dallas, Tex., for controlling the touch sensing component 109.

The processor 114 can also include a microelectronic logic processor for processing signals supplied by the input circuitry 110 according to instructions stored in the storage 116, and outputting results to the output circuitry 112. A suitable processor 114 can be an OMAP 850 processor supplied by Texas Instruments of Dallas, Tex., running Windows Mobile 6.0 operating system supplied by the Microsoft Corporation of Redmond, Wash.

The output circuitry 112 can include circuits and/or controllers for converting signals from the processor 114 to those suitable for output at, e.g., the speaker 106, the display 108, and/or other output devices. For example, the output circuitry 112 can include an LCD display controller (Model No. TMS470), supplied by Texas Instruments of Dallas, Tex., for controlling the display 108.

The storage 116 can include a hard drive, a flash ROM, an EPROM, and/or other suitable persistent computer-readable medium for storing instructions, records, and other data. For example, instructions for processing user input via the touch sensing component 109, as described in more detail below with reference to FIGS. 6-8, can be stored in the storage 116. These instructions can be at least partially incorporated into the operating system of the processor 114 or can be an independent application.

During use, the electronic device 100 can recognize the attributes of an input mechanism and, in response, implement preselected operational characteristics based on the recognized input mechanism. Operational characteristics generally refer to features in the user interface, functionality, and/or other operational aspects of the electronic device 100. As a result, implementing preselected operational characteristics can include displaying a pre-configured user interface corresponding to the recognized input mechanism, activating certain functions, and/or otherwise modifying the behavior of the electronic device 100.

Referring to FIGS. 1 and 2 together, after the electronic device 100 is powered on, the processor 114 can command the input circuitry 110 to monitor input from the touch sensing component 109. If the input circuitry 110 detects a touch on the touch sensing component 109, the processor 114 can indicate that a touch has been received from an input mechanism; otherwise, the processor 114 can command the input circuitry 110 to continue monitoring for a touch.

If a touch is detected, the processor 114 can command the input circuitry 110 to periodically measure at least one of a position, a pressure, a temperature, an optical image, and/or other parameters of the touch. For example, when the touch sensing component 109 includes a resistive, infrared, or SAW type touch screen, the measured input data can include a two-dimensional position of the touch. When the touch sensing component 109 includes a capacitive touch screen, the measured input data can include the number of sensor pads activated by the touch. In other embodiments, the measured input can also include a temperature, a pressure, and/or an optical image of the touch. The measured input data can be temporarily stored in the storage 116 and/or other storage locations.

The processor 114 can then analyze the measured input data based on the logic stored in the storage 116 to determine the attributes of the input mechanism. In one embodiment, the processor 114 can identify the input mechanism by calculating a distribution of the measured position and/or pressure data. If the distribution is above a distribution threshold, then the processor 114 can indicate that the input mechanism is one with a large contact area, e.g., a finger; otherwise, the input mechanism is one with a small contact area, e.g., a pointing device. In another embodiment, the processor 114 can compare the measured temperature of the touch to a temperature threshold. If the temperature is above the temperature threshold, then the processor 114 can indicate that the input mechanism is one with a high temperature, e.g., a finger; otherwise, the input mechanism is one with a low temperature, e.g., a pointing device. In another embodiment, the processor 114 can compare the measured image data to a series of profile images stored in the storage 116. If the image is substantially similar to one of the profile images, then the processor 114 can indicate that the input mechanism is the one corresponding to the matched profile image. In further embodiments, the processor 114 can utilize a combination of the various analysis techniques described above to determine the attributes of the input mechanism.

The processor 114 can then implement different operational characteristics based on the indicated input mechanism. For example, the processor 114 can maintain the current operational characteristics when the processor 114 indicates that the current operational characteristics correspond to the identified input mechanism. The processor 114 can also implement new operational characteristics when the processor 114 indicates that current operational characteristics do not correspond to the identified input mechanism.

FIGS. 3-5 illustrate an example of implementing different operational characteristics based on the indicated input mechanism (i.e., a pointing device 118 or a finger 136). As shown in FIG. 3, if the processor 114 indicates that the pointing device 118 is the current input mechanism, the processor 114 can maintain the user interface 120 when it is preselected for the pointing device 118. If the processor 114 indicates that a user accesses the electronic device 100 using the finger 136 instead of the pointing device 118, as illustrated in FIG. 4, the processor 114 can display a new user interface 138 for using the finger 136 to operate the electronic device 100, as illustrated in FIG. 5. The new user interface 138 can include a plurality of finger touchable icons 140 for, e.g., instant messaging, calendar, mail, contacts, media player, Internet browser, and/or other frequently used applications. The new user interface 138 can also include finger touchable pictures, images, and/or other objects suitable for use with the finger 136.

Several embodiments of the electronic device 100 can enable tailoring accessibility to frequently used programs/applications based on the currently used input mechanism. For example, when the user uses the finger 136 to operate the electronic device 100, the original user interface 120 may not be best suited because the menu items may be spatially too close to one another. Thus, the user may have difficulties in accessing and differentiating certain programs/applications. Accordingly, by implementing the new user interface 138 with large icons of frequently used programs/applications, the user experience of operating the electronic device 100 can be improved.

Several embodiments of the electronic device 100 can also improve usability of the electronic device 100 by providing easy access to frequently used programs/applications. Instead of requiring a user to navigate through icons scattered over a large number of menus to access certain programs/applications, embodiments of the electronic device 100 can display these programs/applications conveniently grouped together for a particular input mechanism.

Even though FIGS. 3-5 illustrate implementing the new user interface when the input mechanism changes from the pointing device 118 to the finger 136, in other embodiments, the electronic device 100 can also have different functionalities. For example, the electronic device 100 can display a real cursor when accessed using the pointing device 118 but a virtual cursor when accessed using the finger 136. The electronic device 100 can also interpret certain motions of the touch differently depending on the current input mechanism. For example, a long stroke on the touch sensing component 109 may be interpreted as panning when performed by the pointing device 118 but as erasing when performed by the finger 136.

C. Methods of Operating Electronic Devices

Figure 6:
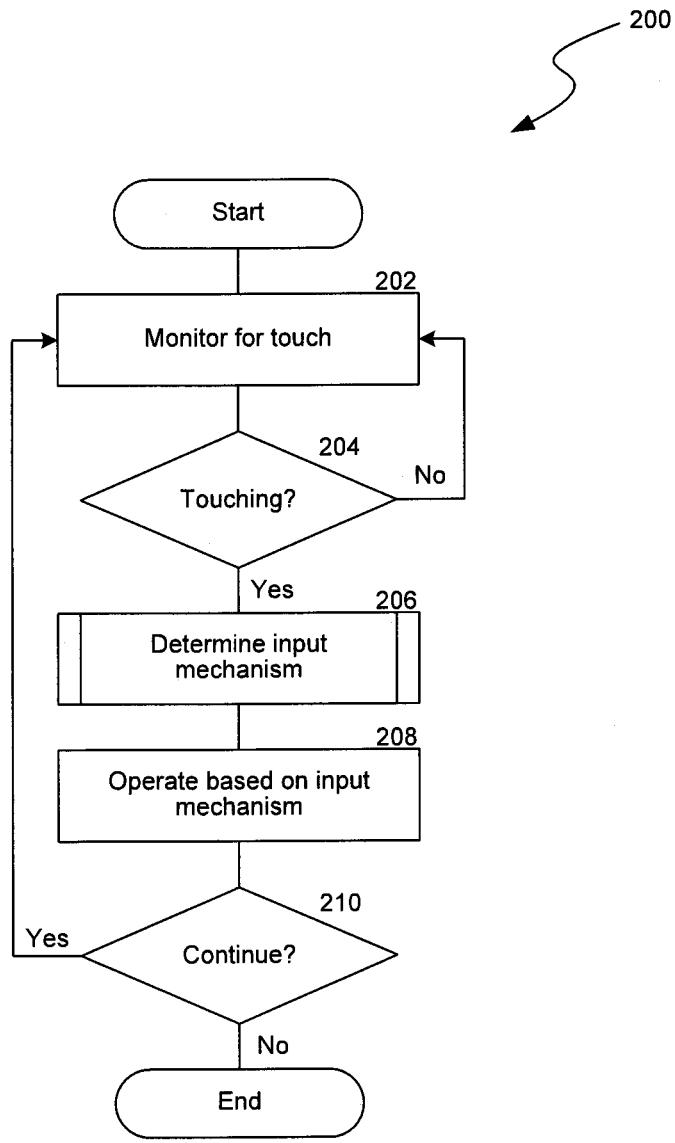
FIG. 6 is a flow chart illustrating a method of operating an electronic device with preselected operational characteristics and configured in accordance with an embodiment of the invention.

FIG. 6 is a flow chart illustrating a method 200 of operating an electronic device with preselected operational characteristics and configured in accordance with an embodiment of the invention. The method 200 can be implemented as a computer program stored in the storage 116 for execution by the processor 114 of FIG. 2. The method 200 can also be implemented as one or more computer modules or routines at least partially incorporated into the operating system of the processor 114. Even though the method 200 is described below in the context of the electronic device 100 of FIGS. 1-5 for purposes of illustration, those of ordinary skill in the art will understand that the method 200 can also be performed in other computing systems having similar or different configurations.

The method 200 can include monitoring for a touch from an input mechanism (block 202). A decision is then made at block 204. If a touch is indicated, the process continues to determining the input mechanism (block 206); otherwise, the process reverts to monitoring for a touch at block 202. Various embodiments of determining the input mechanism are described in more detail below with reference to FIGS. 7 and 8.

The method 200 can also include implementing operational characteristics for the electronic device based on the determined input mechanism (block 208). For example, the electronic device can have a user interface tailored for a particular input mechanism and can have another interface when the input mechanism changes. The electronic device can also have additional and/or different functions for different input mechanisms. For instance, certain functions (e.g., scrolling, panning, etc.) can be enabled when a particular input mechanism is currently used. The same functions can be disabled when a different input mechanism is used.

The method 200 can further include a decision at block 210 to determine whether the process is continued. The decision can be based on the current operating state of the electronic device. For example, if the electronic device is currently shutting down, then the process is not continued; otherwise, the process reverts to monitoring for a touch from an input mechanism.

Figure 7:
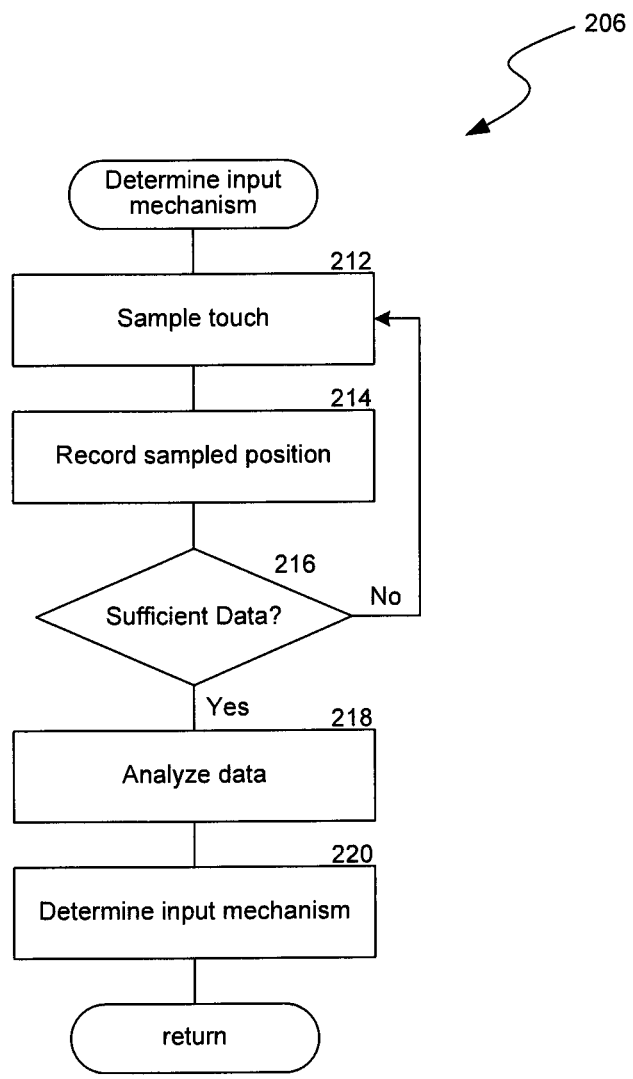
FIG. 7 is a flow chart illustrating a method of determining an input mechanism suitable for use in the method of FIG. 6.

FIG. 7 is a flow chart illustrating an embodiment of a method 206 for determining an input mechanism suitable for use in the method 200 of FIG. 6. The method 206 can include sampling characteristics of the touch (block 212) and recording the measured data in, e.g., a temporary or persistent storage medium (block 214). The measured and recorded characteristics of the touch can include two-dimensional coordinates $(x_i, y_i)$ of the touch, a pressure $(P_i)$ of the touch, a temperature $(T_i)$ of the touch, an image of the touch, and/or other suitable characteristics.

The method 206 can also include a decision block 216 to determine whether sufficient data have been gathered. In one embodiment, sufficient data are gathered when the number of samples exceeds a preset threshold. In another embodiment, sufficient data are gathered when the time period for sampling exceeds a preset threshold. In other embodiments, other indicators can be used to determine whether sufficient data have been gathered.

The method 206 can further include analyzing the gathered data (block 218). In one embodiment, analyzing the gathered data includes calculating a distribution of the gathered data. Using the two-dimensional position as an example, the distribution of the gathered data can include an absolute deviation calculated as follows:

$$x_d = \sum_{i=1}^{n} |x_i - \bar{x}|$$

where n is the number of data points, $x_d$ is the absolute deviation, and $\bar{x}$ is the average value calculated as $$\bar{x} = \frac{\sum_{i=1}^{n} x_i}{n}.$$

The distribution can also be represented by a standard deviation as calculated below:

$$\sigma = \sqrt{\frac{1}{n}\sum_{i=1}^{n}(x_i - \bar{x})^2}$$

where $\sigma$ is the standard deviation. In other embodiments, other statistical variability measures can be used to represent the distribution.

After the distribution is determined, the method 206 can include determining the input mechanism based on the distribution of at least one of the recorded characteristics of the touch (block 220). The inventors have recognized that the derived distribution is typically a function of the input mechanism, specifically, a function of the contact area of the input mechanism. Without being bound by theory, the inventors believe that input mechanisms with large contact areas can result in larger derived distributions than those with small contact areas. The inventors also believe that biomass (e.g., a user's finger) creates less pressure on a touch sensing device and has a higher temperature than a stylus, a pen, and/or other pointing devices at room temperatures. Thus, the processor 114 can differentiate different input mechanisms based on the derived distributions of the position and/or the pressure, or based on the measured temperature on the display. For example, if the position distribution, pressure distribution, and/or the measured temperature is above a threshold, a first input mechanism (e.g., a finger) can be indicated; otherwise, a second input mechanism (e.g., a pointing device) can be indicated. Then, the procedure returns.

Figure 8:
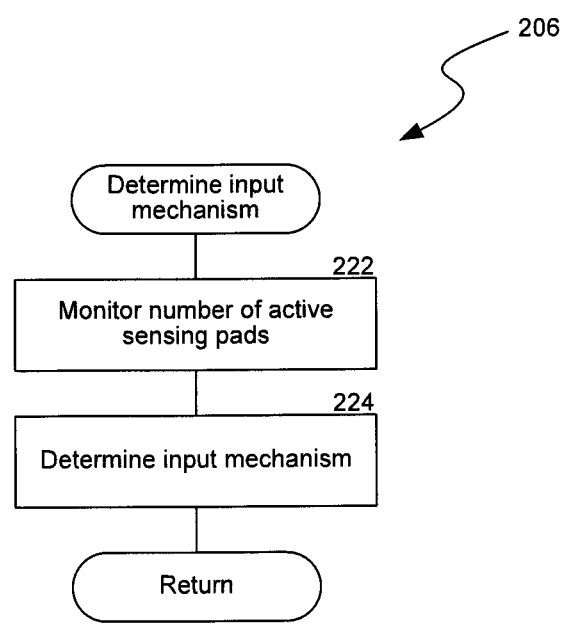
FIG. 8 is a flow chart illustrating another method of determining an input mechanism suitable for use in the method of FIG. 6.

FIG. 8 is a flow chart illustrating another embodiment of the method 206 suitable for use in the method of FIG. 6. The method 206 can include monitoring the number of sensor pads activated by the touch (block 222) when the electronic device includes a touch screen (e.g., capacitive touch screen) divided into sensor pads arranged in a matrix. Then, the method 206 can include determining the input mechanism based on the monitored number of active sensor pads (block 224). For example, if the number of active sensor pads is above a threshold, a first input mechanism (e.g., a finger) can be indicated; otherwise, a second input mechanism (e.g., a conductive pointing device) can be indicated. Then the procedure returns.

From the foregoing, it will be appreciated that specific embodiments of the invention have been described herein for purposes of illustration, but that various modifications may be made without deviating from the invention. The electronic devices can also include additional components attached to the housing 101, such as a reserve battery compartment, jog wheels, and/or other electronic components. Certain aspects of the invention described in the context of particular embodiments may be combined or eliminated in other embodiments. For example, the directional keypad 104 and/or the push buttons 102 can be omitted from the electronic device 100 in certain embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. An electronic device, comprising:
a touch sensing component that senses a touch from an input mechanism;
an input circuitry that periodically measures samples of a position of the sensed touch, a pressure of the sensed touch, a temperature of the sensed touch, or an image of the sensed touch from the touch sensing component;
a storage that stores each periodically measured sample of the parameter from the input circuitry; and
a processor configured to:
determine a number of stored periodically measured samples,
compare the number of stored periodically measured samples to a preset threshold value,
upon determining that the number of stored periodically measured samples is equal to or greater than the threshold value, perform an analysis of the stored periodically measured samples, and
implement preselected operational characteristics of the electronic device based on the performed analysis.

2. The electronic device of claim 1, wherein the storage stores instructions for performing the analysis of the periodically measured samples of the sensed position of the touch, the sensed pressure of the touch, the sensed temperature of the touch, or the sensed image of the touch and implementing preselected operational characteristics of the electronic device based on the performed analysis.

3. The electronic device of claim 2 wherein the instructions are at least partially incorporated into an operating system of the processor or the instructions are an independent application.

4. The electronic device of claim 1 wherein the touch sensing component includes a resistive touch screen, a capacitive touch screen, an infrared touch screen, a surface acoustic wave touch screen, a pressure sensor, or a temperature sensor.

5. The electronic device of claim 1 wherein the touch sensing component includes a capacitive touch screen having a plurality of sensor pads, and wherein the input circuitry is configured to measure a number of the sensor pads activated by the touch.

6. The electronic device of claim 1 wherein the processor, to perform the analysis of the stored periodically measured samples, calculates a distribution of the stored periodically measured samples, and implements at least one of:
a first user interface or a first function of the electronic device in response to determining that the distribution is greater than a threshold; or
a second user interface or a second function of the electronic device in response to determining that the distribution is less than the threshold.

7. The electronic device of claim 1 wherein the input circuitry periodically measures samples of a position or a pressure of the touch, and wherein the processor calculates an absolute deviation or a standard deviation of the measured position or pressure.

8. The electronic device of claim 1 wherein the processor implements features in a user interface or functionality of the electronic device.

9. The electronic device of claim 1 wherein the electronic device is a PDA, a cellular phone, a laptop computer, a tablet PC, a smart phone, or a hand-held email device.

10. A method for operating an electronic device, comprising:
periodically measuring samples of a position of the detected touch, a pressure of the detected touch, a temperature of the detected touch, or an image of the detected touch from an input mechanism on a touch sensing component of the electronic device;
recording each periodically measured sample of the position of the detected touch, the pressure of the detected touch, the temperature of the detected touch, or the image of the detected touch in a storage component of the electronic device;
comparing a number of stored periodically measured samples in the storage component to a preset threshold;
upon determining that the number of stored periodically measured samples in the storage component is greater than or equal to the threshold, performing an analysis of the stored periodically measured samples; and
implementing preselected operational characteristics of the electronic device based on the performed analysis.

11. The method of claim 10 wherein performing an analysis includes performing an analysis using instructions that are at least partially incorporated into an operating system of a processor or are an independent application of the electronic device.

12. The method of claim 10 wherein performing an analysis includes calculating a distribution of the stored periodically measured samples.

13. The method of claim 10 wherein performing an analysis includes calculating a distribution of the recorded periodically measured samples, and wherein implementing operational characteristics includes implementing at least one of:
a first user interface or a first function of the electronic device in response to determining that the distribution is greater than a threshold; or
a second user interface or a second function of the electronic device if the distribution is less than the threshold.

14. The method of claim 10 wherein periodically measuring samples of the position of the detected touch, the pressure of the detected touch, the temperature of the detected touch, or the image of the detected touch includes periodically sampling and storing a position and a pressure of the detected touch, and wherein performing an analysis includes calculating an absolute deviation of the measured position and pressure.

15. The method of claim 14 wherein the absolute deviation of the measured position and pressure are calculated as follows:

$$x_d = \sum_{i=1}^{n} |x_i - \bar{x}|$$

where n is the number of data points, $x_d$ is the absolute deviation, and $\bar{x}$ is the average value calculated as $$\bar{x} = \frac{\sum_{i=1}^{n} x_i}{n}.$$

16. The method of claim 10 wherein periodically measuring samples of the position of the detected touch, the pressure of the detected touch, the temperature of the detected touch, or the image of the detected touch includes periodically sampling and recording a position and a pressure of the detected touch, and wherein performing an analysis includes calculating a standard deviation of the measured position and pressure.

17. The method of claim 16 wherein the standard deviation of the measured position and pressure are calculated as follows:

$$\sigma = \sqrt{\frac{1}{n} \sum_{i=1}^{n} (x_i - \bar{x})^2}$$

where $\sigma$ is the standard deviation.

18. The method of claim 10 wherein periodically measuring samples of the position of the detected touch, the pressure of the detected touch, the temperature of the detected touch, or the image of the detected touch includes periodically measuring a number of sensor pads activated by the detected touch, and wherein performing an analysis includes comparing the measured number to a second threshold, and wherein implementing preselected operational characteristics includes implementing one of:
a first user interface or a first function of the electronic device if the measured number is greater than the second threshold; or
implementing a second user interface or a second function of the electronic device if the measured number is less than the second threshold.

19. The method of claim 10 wherein implementing preselected operational characteristics includes implementing features in a user interface or functionality of the electronic device.

20. A non-transitory computer-readable medium containing instructions, which when executed by a processor, cause the processor to perform the method of claim 10.

21. A method for operating an electronic device, comprising:
detecting a touch from an input mechanism;
collecting a set of periodic measurements of a position of the detected touch, a pressure of the detected touch, a temperature of the detected touch, or an image of the detected touch;
comparing a quantity of measurements in the set of periodic measurements to a preset threshold number;
upon determining that the quantity of measurements in the set of periodic measurements has reached the preset threshold number, determining an attribute of the input mechanism based on the detected touch; and
implementing preselected operational characteristics of the electronic device based on the determined attribute of the input mechanism.

22. The method of claim 21 wherein determining an attribute of the input mechanism includes using instructions that are at least partially incorporated into an operating system of a processor or are an independent application of the electronic device.

23. The method of claim 21 wherein determining an attribute of the input mechanism includes calculating an absolute deviation or a standard deviation of the collected set of readings.

24. The method of claim 21 wherein determining an attribute of the input mechanism includes indicating whether the input mechanism is a pointing device or a finger of a user, and wherein implementing preselected operational characteristics includes implementing one of:
a first user interface in response to indicating that the input mechanism is the pointing device; or
a second user interface in response to indicating that the input mechanism is the finger of the user.

25. The method of claim 21 wherein determining an attribute of the input mechanism includes:
measuring a number of sensor pads activated by the touch from the input mechanism; and
indicating that a kind of the input mechanism according to whether the measured number is greater or less than a threshold.

26. A non-transitory computer-readable medium containing instructions, which when executed by a processor, cause the processor to perform the method of claim 21.

27. A method for operating an electronic device, comprising:
detecting a touch from an input mechanism;
periodically collecting samples associated with the detected touch, wherein the samples include measurements of at least one of a position of the detected touch, a pressure of the detected touch, a temperature of the detected touch, and an optical image of the detected touch;
comparing a quantity of samples collected to a preset threshold number of samples;
determining that the quantity of samples collected exceeds the preset threshold number;
analyzing the collected samples;
determining whether the input mechanism is a pointing device or a finger of a user according to the analyzed set of readings;
implementing first preselected operational characteristics of the electronic device in response to determining that the input mechanism is the pointing device; and
implementing second preselected operational characteristics of the electronic device in response to determining that the input mechanism is the finger of the user, the first preselected operational characteristics being different from the second preselected operational characteristics.

28. The method of claim 27 wherein determining whether the input mechanism is a pointing device or a finger of a user includes determining whether the input mechanism is a pointing device or a finger of a user using instructions that are at least partially incorporated into an operating system of a processor or are an independent application of the electronic device.

29. The method of claim 27 wherein analyzing the collected samples includes calculating an absolute deviation of the collected samples, and wherein determining whether the input mechanism is a pointing device or a finger of a user includes indicating that the input mechanism is the pointing device if the absolute deviation is below a threshold and indicating that the input mechanism is the finger if the absolute deviation is above the threshold.

30. The method of claim 27 wherein determining whether the input mechanism is a pointing device or a finger of a user includes:
comparing a measured temperature to a temperature threshold;
indicating that the input mechanism is the finger if the measured temperature is greater than a temperature threshold; and
indicating that the input mechanism is the pointing device if the measured temperature is less than the temperature threshold.

31. The method of claim 27 wherein implementing first or second preselected operational characteristics includes implementing features in a user interface or functionality of the electronic device.

32. The method of claim 27 wherein periodically collecting samples associated with the detected touch includes collecting samples of a position and a pressure of the detected touch, and wherein analyzing the collected samples includes calculating an absolute deviation of the collected samples of the position and the pressure, and wherein determining whether the input mechanism is a pointing device or a finger of a user includes indicating that the input mechanism is the pointing device if the absolute deviation of both the position and the pressure is below a threshold and indicating that the input mechanism is the finger if the absolute deviation of both the position and the pressure is above the threshold.

33. A non-transitory computer-readable medium containing instructions, which when executed by a processor, cause the processor to perform the method of claim 27.

* * * * *